(12) United States Patent
Das et al.

(10) Patent No.: US 7,796,646 B2
(45) Date of Patent: Sep. 14, 2010

(54) METHOD AND APPARATUS TO PERFORM SEGMENTATION OFF-LOAD BETWEEN TWO LOGICAL PARTITIONS

(75) Inventors: Ranadip Das, West Bengal (IN); Kiet H. Lam, Round Rock, TX (US); Vasu Vallabhaneni, Austin, TX (US); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 829 days.

(21) Appl. No.: 11/627,180

(22) Filed: Jan. 25, 2007

(65) Prior Publication Data

US 2008/0184224 A1     Jul. 31, 2008

(51) Int. Cl.
H04J 3/24 (2006.01)
(52) U.S. Cl. .............................. 370/474; 370/464; 718/1
(58) Field of Classification Search .................. 370/464, 370/474; 718/1; 703/13, 21–25
See application file for complete search history.

(56) References Cited

U.S. PATENT DOCUMENTS

| 6,430,187 | B1 * | 8/2002 | Park ............................ 370/397 |
| 2003/0130832 | A1 * | 7/2003 | Schulter et al. ............... 703/23 |
| 2005/0147126 | A1 | 7/2005 | Qiu et al. |
| 2006/0018315 | A1 * | 1/2006 | Baratakke et al. ........... 370/389 |
| 2006/0209718 | A1 * | 9/2006 | Kinsey et al. ............... 370/254 |
| 2007/0025395 | A1 * | 2/2007 | Cardona et al. ............. 370/474 |

* cited by examiner

*Primary Examiner*—William Trost, IV
*Assistant Examiner*—Charles C Jiang
(74) *Attorney, Agent, or Firm*—Yee & Associates, P.C.; Matthew W. Baca

(57) ABSTRACT

A method for virtual segmentation off-load in a logically partitioned data processing system is provided. A data transmission protocol stack formats a data message for segmentation off-load to form a virtual segmentation off-load package. The size of the data message is larger than a size of a maximum transmission unit. A partition manager firmware copies the virtual segmentation off-load package from a first logical partition to a virtual Ethernet adapter associated with a second logical partition. The virtual segmentation off-load package is copied without performing a segmentation operation on the data message associated with the virtual segmentation off-load package.

17 Claims, 7 Drawing Sheets

METHOD AND APPARATUS TO PERFORM SEGMENTATION OFF-LOAD BETWEEN TWO LOGICAL PARTITIONS

BACKGROUND OF THE INVENTION

1. Field of the Invention

The present application is related generally to a data processing system and in particular to a method and apparatus for a virtual network. More particularly, the present application is directed to a computer implemented method, apparatus, and computer usable program code for performing segmentation off-load between logical partitions over a virtual network.

2. Description of the Related Art

Modern computing systems support virtualization to divide one physical machine into multiple logical partitions, also referred to as virtual machines. A separate and independent operating system (OS) is run on each logical partition. Each logical partition is isolated from every other logical partition to keep a malfunction or problem in one logical partition from affecting other logical partitions located on the same physical machine.

In a local area network (LAN), separate physical computers connect and communicate with each other by means of a physical Ethernet adapter on each computer. Likewise, logical partitions in a logically partitioned data processing system connect and communicate with other logical partitions on the same machine by means of a virtual Ethernet adapter on each logical partition. A virtual Ethernet adapter is a software implementation that simulates a physical Ethernet adapter. Virtual Ethernet adapters allow networking applications running on a logically partitioned machine to function without modification to the applications.

Hardware acceleration technology has been used to allow operating systems to off-load work, such as segmentation, to the hardware Ethernet adapter. Segmentation is a process for breaking up large data messages into smaller segments that can pass through all network elements. Segmentation is necessary because data in a network is typically transmitted from one entity to another entity in the network in a data packet or frame. A maximum transmission unit (MTU) is the largest size packet or frame that can be sent over the network. Therefore, if a data message larger than the MTU size needs to be sent over an Ethernet network, segmentation is performed to convert the message into data segments equal to or less than the MTU size.

TCP segmentation off-load (TSO) allows the operating system to pass the job of performing segmentation to the hardware Ethernet adapter. Segmentation off-load is the process of off-loading the task of segmenting data to the network adapter or network card. In other words, segmentation off-load is the process of shifting the task of segmenting data from the operating system to a hardware adapter. For example, if a 32,768 byte message needs to be transmitted over an Ethernet network with an MTU size of 1500 bytes and the Ethernet adapter supports TSO, the operating system can simply give the entire message to the Ethernet adapter. The Ethernet adapter performs TCP segmentation to break the message into 1460 byte units for transmission. However, in the absence of TSO, the operating system breaks the message into 23 units of 1460 bytes each and sends each of the 23 data units through the TCP stack to transmit the message. Thus, performing segmentation in the TCP stack may result in 4 to 5 times more processor cycle consumption than in TSO. Thus, an Ethernet that utilizes TSO reduces processor cycle consumption and improves processor efficiency. However, TSO cannot be implemented in virtual Ethernet adapters to improve processor performance because a virtual Ethernet adapter is a software implementation rather than a hardware implementation. Therefore, performing segmentation in the virtual Ethernet adapter can consume an equivalent number of processor cycles as segmentation tasks in the TCP stack.

In another solution, a virtual Ethernet network can be configured with a larger MTU size to avoid the need for segmentation. This method allows the TCP stack to reduce utilization of processor cycles. However, the increased MTU size configuration applies to all messages transmitted through the network, including TCP and user datagram protocol (UDP) messages. UDP does not support variable MTU size. Therefore, increasing the MTU size can cause UDP network applications to cease function when one of the virtual Ethernet network adapters is configured with a smaller MTU size than other virtual Ethernet adapters.

Changing the MTU size can also result in problems during acknowledgement generation and congestion window maintenance work on a per maximum segment size (MSS) basis. In addition, some logical partitions may implement operating systems that do not support large incoming data packets that exceed the logical partition MTU size, such as in Linux® operating systems. In some of these cases, the operating system will crash when a data packet that exceeds the MTU size is received. Therefore, current methods fail to provide an efficient and reliable means to reduce segmentation in a logical partition data processing system.

SUMMARY OF THE INVENTION

The illustrative embodiments provide a computer implemented method, apparatus, and computer usable program code for virtual segmentation off-load. In one embodiment, the process formats a data message for segmentation off-load to form a virtual segmentation off-load package. The size of the data message is larger than a size of a maximum transmission unit. A partition manager firmware copies the virtual segmentation off-load package from a first logical partition to a virtual network adapter associated with a second logical partition. The virtual segmentation off-load package is copied without performing a segmentation operation on the data message associated with the virtual segmentation package.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
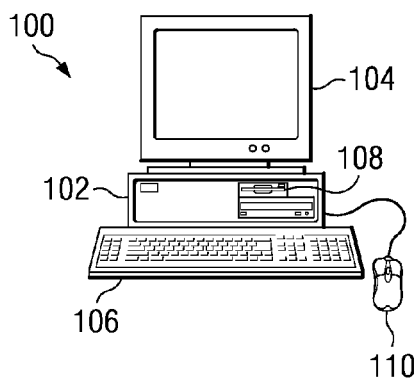
FIG. 1 is a pictorial representation of a data processing system in which illustrative embodiments may be implemented.
Figure 2:
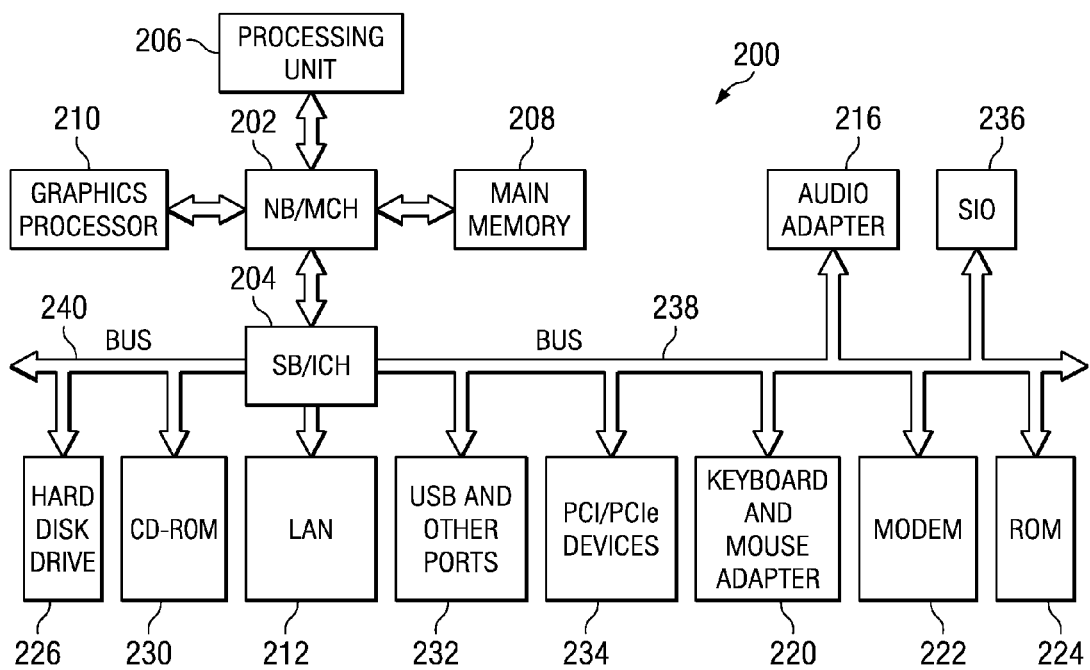
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures and in particular with reference to FIG. 1, a pictorial representation of a data processing system is shown in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices include a joystick, touchpad, touch screen, trackball, microphone, and the like.

Computer 100 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Turning now to FIG. 2, a block diagram of a data processing system is depicted in which illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204, audio adapter 216, keyboard and mouse adapter 220, modem 222, read only memory (ROM) 224, universal serial bus (USB) ports, and other communications ports 232. PCI/PCIe devices 234 are coupled to south bridge and I/O controller hub 204 through bus 238. Hard disk drive (HDD) 226 and CD-ROM drive 230 are coupled to south bridge and I/O controller hub 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206. This operating system coordinates and controls various components within data processing system 200 in FIG. 2. The operating system may be a commercially available operating system, such as Microsoft® Windows XP®. (Microsoft® and Windows XP® are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java-based trademarks are trademarks of Sun Microsystems, Inc. in the United States, other countries, or both.

Instructions for the operating system, the object-oriented programming system, and applications or programs are located on storage devices, such as hard disk drive 226. These instructions and may be loaded into main memory 208 for execution by processing unit 206. The processes of the illustrative embodiments may be performed by processing unit 206 using computer implemented instructions, which may be located in a memory. An example of a memory is main memory 208, read only memory 224, or in one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 can be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, laptop computer, or telephone device.

Other components shown in FIG. 2 can be varied from the illustrative examples shown. For example, a bus system may be comprised of one or more buses, such as a system bus, an I/O bus, and a PCI bus. Of course the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 208 or a cache such as found in north bridge and memory controller hub 202. Also, a processing unit may include one or more processors or CPUs.

The depicted examples in FIG. 1 and FIG. 2 are not meant to imply architectural limitations. In addition, the illustrative embodiments provide for a computer implemented method, apparatus, and computer usable program code for compiling source code and for executing code. The methods described with respect to the depicted embodiments may be performed in a data processing system, such as data processing system 100 shown in FIG. 1 or data processing system 200 shown in FIG. 2.

Figure 3:
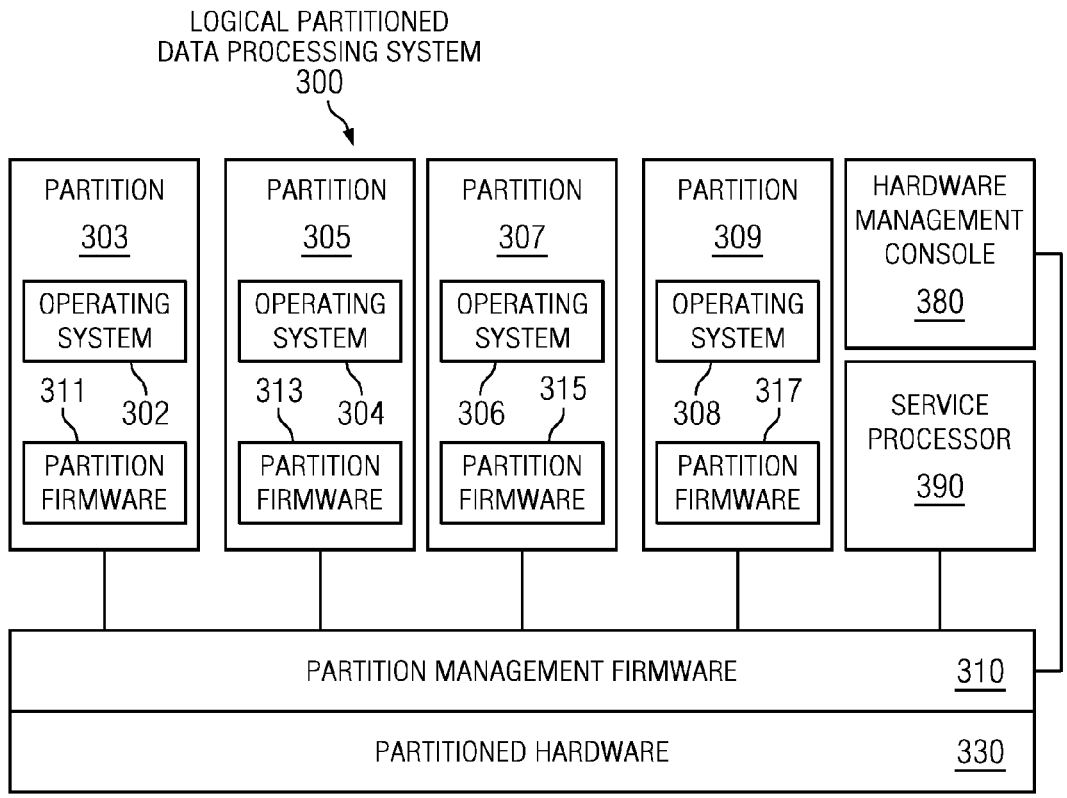
FIG. 3 is a block diagram of an exemplary logically partitioned platform in which illustrative embodiments may be implemented.

FIG. 3 is a block diagram of an exemplary logically partitioned platform is depicted in which the present invention may be implemented. The hardware in logically partitioned data processing system 300 may be implemented as, for example, data processing system 200 in FIG. 2. Logically partitioned data processing system 300 includes partitioned hardware 330, operating systems 302, 304, 306, 308, and partition management firmware 310. Operating systems 302, 304, 306, and 308 may be multiple copies of a single operating system or multiple heterogeneous operating systems simultaneously running on logically partitioned data processing system 300. These operating systems may be implemented using IBM's i5/OS, which is designed to interface with partition management firmware, such as IBM's P-HYPE (Partition Hypervisor). i5/OS is used only as an example in these illustrative embodiments. Of course, other types of operating systems, such as IBM's AIX and Linux, may be used depending on the particular implementation. Operating systems 302, 304, 306, and 308 are located in partitions 303, 305, 307, and 309. Hypervisor software is an example of software that may be used to implement partition management firmware 310 and is available from International Business Machines Corporation. Firmware is "software" that is not accessible to the machine user or owner and is licensed as part of the physical machine.

Additionally, these partitions also include partition firmware 311, 313, 315, and 317. Partition firmware 311, 313, 315, and 317 may be implemented using initial bootstrap code, IEEE-1275 Standard Open Firmware, and runtime abstraction software (RTAS), which is available from International Business Machines Corporation. When partitions 303, 305, 307, and 309 are instantiated, a copy of bootstrap code is loaded onto partitions 303, 305, 307, and 309 by partition management firmware 310. Thereafter, control is transferred to the bootstrap code with the bootstrap code then loading the open firmware and RTAS. The processors associated or assigned to the partitions are then dispatched to the partition's memory to execute the partition firmware.

Partitioned hardware 330 can include a plurality of processors, a plurality of system memory units, a plurality of input/output (I/O) adapters, and storage units, such as those shown in FIG. 2. Partitioned hardware is allocated to one of multiple different partitions, such as partitions 303, 305, 307, and 309, within logical partitioned data processing system 300, each of which corresponds to one of operating systems 302, 304, 306, and 308.

Partition management firmware 310 performs a number of functions and services for partitions 303, 305, 307, and 309 to create and enforce the partitioning of logically partitioned data processing system 300. Partition management firmware 310 is firmware that manages the logical partitions on the underlying hardware. Thus, partition management firmware 310 allows the simultaneous execution of independent OS images 302, 304, 306, and 308 by virtualizing all of the hardware resources of logically partitioned data processing system 300.

Service processor 390 may be used to provide various services, such as the processing of platform errors in the partitions. These services also may act as a service agent to report errors back to a vendor, such as International Business Machines Corporation. Operation of the various partitions may be controlled through a hardware management console, such as hardware management console 380. Hardware management console 380 is a separate data processing system from which a system administrator may perform various functions including reallocation of resources among the partitions.

Increasingly large symmetric multi-processor data processing systems are being partitioned and used as smaller systems. These systems are also referred to as logically partitioned data processing systems. A logically partitioned data processing system allows multiple copies of a single operating system or multiple heterogeneous operating systems to be simultaneously run on a single physical computing system platform. A partition, within which an operating system image runs, is assigned a subset and/or a share of the platform's resources. These platform allocable resources include one or more architecturally distinct processors with their interruption-management area, regions of system memory, and input/output (I/O) adapters. The partition's resources are represented to the operating system image by the platform's firmware.

Each distinct operating system or image of an operating system running within a platform is protected from the others such that software errors in one logical partition or virtual machine cannot affect the correct operations of any of the other partitions or virtual machines. This protection is provided by allocation controls in the system hardware and firmware for platform resources to be directly managed by each operating system image, and by mechanisms for insuring that any image cannot control any resources that have not been allocated to that image. Furthermore, software errors in the control of an operating system's allocated resources are prevented from affecting the resources of any other image. Thus, each operating system image directly controls a distinct set of allocable resources within the platform.

With respect to hardware resources in a logically partitioned data processing system, these resources are shared among various partitions. These resources may include, for example, input/output (I/O) adapters, memory DIMMs, non-volatile random access memory (NVRAM), and disk drives. Each partition may be booted and shut down over and over without having to power-cycle the entire physical computing entity.

A logically partitioned data processing system may also be a single-level logically partitioned system or a multi-level logically partitioned system. In multi-level systems, each logical computing entity can, in turn, be divided into multiple "second-level" entities. A second-level entity can likewise be divided into multiple "third-level" entities, and so forth. A logical computing entity comprising multiple second-level entities is sometimes referred to as a "first-level" logical computing entity. For purposes of clarity, the term "logical partition" as used herein may refer to a logical partition that is not supporting any second-level entities, as well as a first-level logical partition that is supporting second-level entities.

Figure 4:
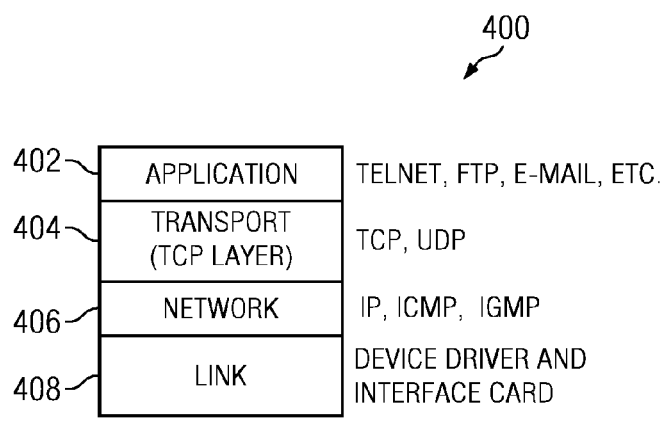
FIG. 4 is a diagram of a transmission control protocol/Internet protocol (TCP/IP) and similar protocols depicted in accordance with an illustrative embodiment.

FIG. 4 is a diagram of a transmission control protocol/ Internet protocol (TCP/IP) and similar protocols are depicted in accordance with an illustrative embodiment. TCP/IP and similar protocols are utilized by communications architecture 400. In this example, communications architecture 400 is a 4-layer system. This architecture includes application layer 402, transport layer 404, network layer 406, and link layer 408. Communications architecture 400 may also be referred to as a TCP/IP stack.

Each layer is responsible for handling various communications tasks. Link layer 408 also is referred to as the data-link layer or the network interface layer and normally includes the device driver in the operating system and the corresponding network interface card in the computer. This layer handles all the hardware details of physically interfacing with the network media being used, such as optical cables or Ethernet cables.

Network layer 406 also is referred to as the internet layer and handles the movement of packets of data around the network. For example, network layer 406 handles the routing of various packets of data that are transferred over the network. Network layer 406 in the TCP/IP suite is comprised of several protocols, including Internet protocol (IP), Internet control message protocol (ICMP), and Internet group management protocol (IGMP).

Next, transport layer 404 provides an interface between network layer 406 and application layer 402 that facilitates the transfer of data between two host computers. Transport layer 404 is concerned with things such as, for example, dividing the data passed to it from the application into appropriately sized chunks for the network layer below, acknowledging received packets, and setting timeouts to make certain the other end acknowledges packets that are sent. In the TCP/IP protocol suite, two distinctly different transport protocols are present, TCP and User datagram protocol (UDP). TCP provides reliability services to ensure that data is properly transmitted between two hosts, including dropout detection and retransmission services.

Conversely, UDP provides a much simpler service to the application layer by merely sending packets of data called datagrams from one host to the other, without providing any mechanism for guaranteeing that the data is properly transferred. When using UDP, the application layer must perform the reliability functionality.

Application layer 402 handles the details of the particular application. Many common TCP/IP applications are present for almost every implementation, including a Telnet for remote login; a file transfer protocol (FTP); a simple mail transfer protocol (SMTP) for electronic mail; and a simple network management protocol (SNMP).

The illustrative embodiments provide a computer implemented method, apparatus, and computer program product for virtual transmission control protocol segmentation off-load in a logically partitioned data processing system. A data transmission protocol stack, such as a TCP stack, formats a data message for segmentation off-load to form a virtual segmentation off-load package. The size of the data message is larger than the size of a maximum transmission unit (MTU).

In this example, the virtual segmentation off-load package contains all the data from the data message without any segmentation of the data message. The virtual segmentation off-load package is an un-segmented data package formatted for copying using a segmentation off-load format, such as transmission control protocol segmentation off-load (TSO).

A hypervisor copies the virtual segmentation off-load package from a first logical partition to a virtual network adapter associated with a second logical partition. In one embodiment, the virtual network adapter is a virtual Ethernet adapter in a virtual Ethernet network.

The virtual segmentation off-load package is copied without performing a segmentation operation on the data message associated with the virtual segmentation off-load package. Thus, the entire virtual segmentation off-load package is copied as a single chunk or unit of data despite the fact that the virtual segmentation off-load package is larger than the MTU size.

In the illustrative examples shown in FIGS. 5-11, virtual segmentation off-load is described as a virtual transmission control protocol segmentation off-load (virtual TSO) operation using transmission control protocol segmentation off-load. However, in accordance with the illustrative embodiments, any type of segmentation off-load can be used for virtual segmentation off-load. The illustrative embodiments are not limited to transmission control protocol segmentation off-load.

Figure 5:
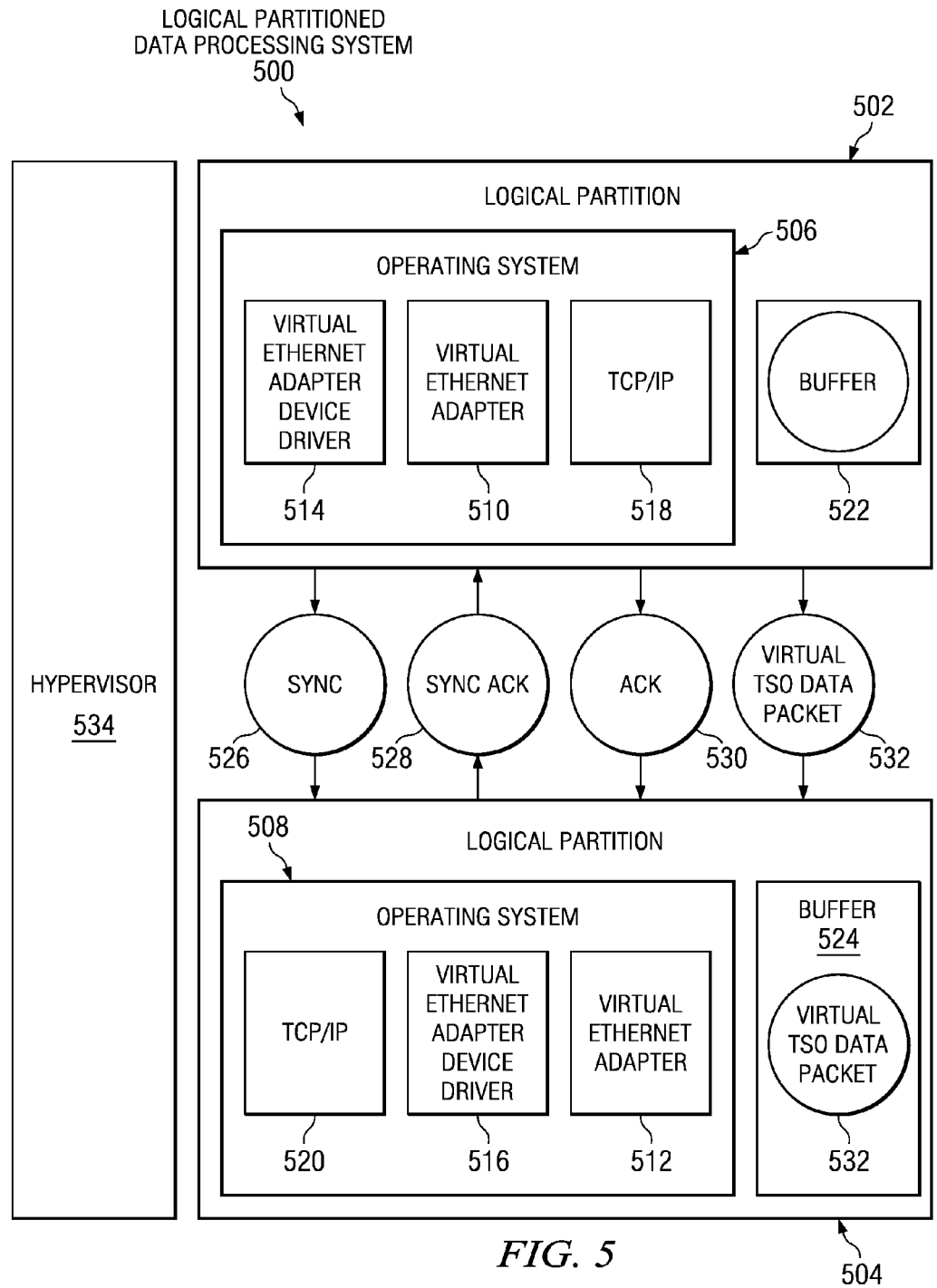
FIG. 5 is a block diagram illustrating a dataflow between two logical partitions during a virtual segmentation off-load operation in accordance with an illustrative embodiment.

Turning now to FIG. 5, a block diagram illustrating a dataflow between two logical partitions during a virtual segmentation off-load operation is depicted in accordance with an illustrative embodiment. Logical partitioned data processing system 500 is a data processing system having two or more logical partitions, such as data processing system 100 in FIG. 1, data processing system 200 in FIG. 2, or logical partitioned data processing system 300 in FIG. 3. Logical partitioned data processing system 500 may be implemented in any type of known or available logically partitioned data processing system or virtualized machine.

Logical partition 502 and logical partition 504 are logical partitions within a single virtualized machine having an independent and separate operating system for each logical partition. Logical partition 502 and 504 are logical partitions, such as logical partitions 303, 305, 307, and 309 in FIG. 3.

In this example, logical partition 502 contains operating system 506 and logical partition 504 contains operating system 508. Operating systems 506 and 508 may be any type of known or available operating systems, including but not limited to, Linux® operating systems, Unix® operating systems, Microsoft® Windows® operating systems, AIX® operating systems, or any other operating system.

Operating systems 506 and 508 can be the same type of operating system. For example, operating systems 506 and 508 may both be Unix® type operating systems. In another example, operating system 506 and 508 can be different or heterogeneous operating systems. For example, operating system 506 can be an AIX® version operating system and operating system 508 can be a Linux® version operating system.

Virtual Ethernet adapters 510 and 512 are virtual network adapters in a virtual Ethernet. Virtual Ethernet adapters 510 and 512 are software components that enable connections and communications between two or more logical partitions in a single logically partitioned data processing system. Virtual Ethernet adapters 510-512 in a logically partitioned data processing system 500 form a virtual Ethernet network.

A virtual Ethernet network is a network between logical partitions in a single virtualized machine, such as logically partitioned data processing system 500. Virtual Ethernet adapters allow each logical partition to connect and communicate with other logical partitions in the same logically partitioned data processing system. In this example, virtual Ethernet adapter 510 allows logical partition 502 to communicate with every other logical partition in logically partitioned data processing system 500, including logical partition 504.

Virtual Ethernet adapter device driver 514 and 516 are virtual device drivers for allowing software to interact transparently with virtual Ethernet adapter 510 and 512. Virtual device drivers 514-516 are software components used in virtualized environments, such as logical partitioned data processing systems. A device driver is a software component that allows another program, such as an operating system or application, to interact transparently with a hardware device. A virtual device driver emulates a hardware device so that a program running inside the virtualized environment can transparently access a virtual device, as if the virtual device were a physical hardware device.

For example, when logical partition 502 on logical partitioned data processing system 500 attempts to communicate with logical partition 504 through the virtual Ethernet network on logical partitioned data processing system 500, operating system 506 routes the request through virtual Ethernet adapter device driver 514. In this example, virtual Ethernet adapter device driver 514 is depicted as a separate component from virtual Ethernet adapter 510. However, in accordance with another embodiment, virtual Ethernet adapter device driver 514 and virtual Ethernet adapter 510 are combined in the same component.

TCP/IP stack 518 and TCP/IP stack 520 are a set of software protocol layers for the transmission of data, such as communication architecture 400 in FIG. 4. TCP/IP stacks 518 and 520 include transmission control protocol (TCP) software layers for implementing TCP communication protocols. TCP protocols permit connections and communications across the virtual Ethernet network. However, TCP/IP stacks 518 and 520 are not limited to transmission control protocols. TCP/IP stacks 518 and 520 may be any known or available protocol for the transmission of data. Therefore, the illustrative embodiments are not limited to TCP protocols for connecting logical partitions and transmitting data.

Buffer 522 and buffer 524 are buffers for the temporary storage of data. Buffers 522 and 524 may be implemented in any type of known or available buffer. In addition, buffers 522 and 524 can include one or more buffers. In this example, buffer 522 is a single buffer for storing data packets received through virtual Ethernet adapter 510 and/or virtual Ethernet adapter device driver 514. In this example, buffer 524 is a buffer for storing data packets received through virtual Ethernet adapter 512 and/or virtual Ethernet adapter device driver 516. In another illustrative example, buffer 522 and virtual Ethernet adapter 516 are combined in a single component.

Thus, in accordance with this illustrative example, when logical partition 502 wants to send a data message that is larger than an MTU size to logical partition 504, TCP/IP stack 518 negotiates a new TCP option to determine if logical partition 504 supports virtual TSO operations. The negotiation occurs during the connection establishment time when a connection is established between logical partition 502 and logical partition 504.

The negotiation begins when TCP/IP stack 518 of logical partition 502 is establishing a connection with TCP/IP stack 520 of logical partition 504. TCP/IP stack 518 makes a determination as to whether the underlying outgoing interface is a virtual Ethernet. TCP/IP stack 518 determines if the outgoing interface is a virtual Ethernet based on whether the interface is an interface between logical partitions in a virtualized machine. If the outgoing interface is a virtual Ethernet, TCP/IP stack 518 inserts a TCP option for virtual TSO in a synchronization (sync) packet 526. Sync packet 526 includes the virtual TSO option.

If logical partition 504 also supports virtual TSO, TCP/IP stack 520 on logical partition 504 sends synchronization acknowledge (sync Ack) package 528 to logical partition 502 that includes a virtual TSO option. Logical partition 504 can support virtual TSO if operating system 508 of logical partition 504 can handle data packets larger than the MTU size. Whether an operating system supports virtual TSO varies with the particular operating system type. Some operating systems, such as AIX® operating system versions, can handle data packets larger than MTU size. However, other operating systems, such as Linux® version operating systems cannot handle data packets larger than MTU size. If the operating system can handle data packages larger than MTU size, then the logical partition can support virtual TSO.

However, if logical partition 504 does not support virtual TSO, TCP/IP stack 520 sends sync Ack package 528 that does not contain a virtual TSO option.

Upon receiving sync Ack package 528, logical partition 502 determines whether logical partition 504 can support virtual TSO. If sync Ack package 528 includes a virtual TSO option, then logical partition 504 supports virtual TSO. If sync Ack package 528 does not include a virtual TSO option, then TCP/IP stack 518 determines that logical partition 504 does not support virtual TSO. Logical partition 502 sends acknowledgement (Ack) 530 package to logical partition 504 indicating receipt of sync Ack package 528.

If both logical partition 502 and 504 support virtual TSO, TCP/IP stacks 518 and 520 will perform a virtual TSO operation to transmit the data package over virtual Ethernet adapters 510 and 512. The virtual TSO operation begins when TCP/IP stack 518 formats the data message as a normal TSO packet to form virtual TSO data packet 532. Virtual TSO data packet 532 contains all the data from the original data message without any segmentation of the message. TCP/IP stack 518 sends virtual TSO data packet 532 to virtual Ethernet adapter device driver 514.

Virtual Ethernet adapter device driver 514 calls hypervisor 534 to transmit virtual TSO data packet 532 to logical partition 504 in a single, un-segmented data package. Hypervisor 534 is partition management firmware. Hypervisor 534 is a logical partition platform that permits multiple operating systems to run in a logically partitioned data processing system. A hypervisor may also be referred to as logical partitioned platform firmware or a virtual machine monitor. Hypervisor 534 can be any type of known or available partition management firmware, including but not limited to, hypervisor software. In this illustrative example, hypervisor 534 is an IBM® pSeries machine hypervisor.

Hypervisor 534 can copy any arbitrary size of data from one virtual Ethernet adapter to another virtual Ethernet adapter as long as the receiving virtual Ethernet adapter has registered buffers with data storage capacity sufficient to hold the data. For example, AIX® virtual Ethernet adapter supports buffer sizes up to 65,536 bytes.

Hypervisor 534 can copy virtual TSO data packet 532 to virtual Ethernet adapter 512 if buffer 524 associated with virtual Ethernet adapter 512 is large enough to hold all of the data in virtual TSO data packet 532. Thus, virtual Ethernet adapter device driver 514 calls Hypervisor 534 to transmit virtual TSO data packet 532, even though virtual TSO data packet 532 is larger than the MTU size. Hypervisor 534 copies the entire large data packet for virtual TSO data packet 532 in one chunk. Virtual TSO data packet 532 is not segmented or broken down into smaller data segments. In other words, an actual TSO operation is not performed on the original data message or on virtual TSO data packet 532.

At the receiving end, virtual Ethernet adapter device driver 516 passes virtual TSO data packet 532 received from hypervisor 534 up the network stack in TCP/IP stack 520. When TCP/IP stack 520 sees or recognizes virtual TSO data packet 532, TCP/IP stack 520 identifies virtual TSO data packet 532 as a virtual TSO data package. In one embodiment, TCP/IP stack 520 does not perform a checksum operation on virtual TSO data packet 532. A checksum operation is an operation to verify that data in a data package has not become corrupted. TCP/IP stack 520 skips the checksum operation because the data in virtual TSO data packet 532 is copied from one location in logical partitioned data processing system 500 to another location in the same machine. Data corruption is assumed to not occur in such a situation. However, if the data package had been received from a separate machine through an actual Ethernet network, a checksum operation would be necessary to check the validity, integrity, and/or accuracy of the data.

TCP/IP stack 520 delivers virtual TSO data packet 532 to a socket associated with logical partition 504. A socket is one end point of a two-way communication link between two programs running on a network. In this case, the socket is an end point of a two-way communication link between two virtual Ethernet adapters on a virtual Ethernet network. The data in virtual TSO data packet 532 is now received and available for use by logical partition 504. Thus, in this illustrative embodiment, a logical partition can send a data package that is larger than an MTU size over a virtual Ethernet network connection without performing any segmentation of the data package.

In this example, hypervisor 534 can copy virtual TSO data packet 532 to virtual Ethernet adapter 512 if buffer 524 associated with virtual Ethernet adapter 512 is large enough to hold all of the data in virtual TSO data packet 532. In another example, if virtual TSO data packet 532 is too large for buffer 524, a segmentation operation may be performed to create two or more virtual TSO data packets that are the same size as buffer 524. In this manner, the virtual TSO data packets can be copied, one at a time, into buffer 524.

Figure 6:
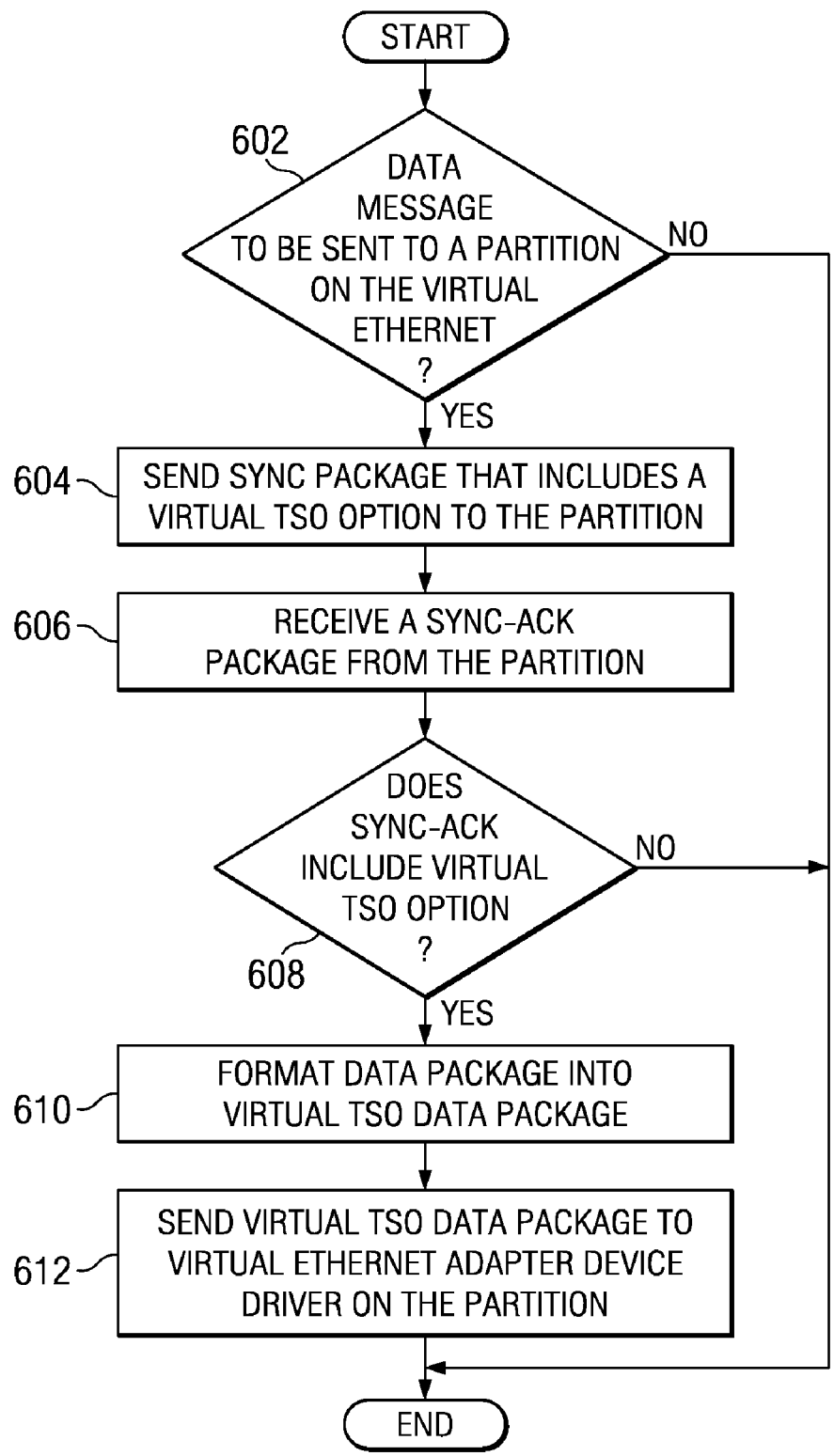
FIG. 6 is a flowchart illustrating a process for a TCP connection negotiation by an initiator of the connection in accordance with an illustrative embodiment.

Referring now to FIG. 6, a flowchart illustrating a process for a TCP connection negotiation by an initiator of the connection is shown in accordance with an illustrative embodiment. In this illustrative example shown in FIG. 6, the process is performed by a software component for enabling connections and communications between logical partitions in a virtual Ethernet network. The process may be performed by any protocol for transmitting data, including but not limited to, a transmission control protocol stack, such as TCP/IP stacks 518 and 520 of FIG. 5.

The process begins during connection establishment time when the process makes a determination as to whether a data message is to be sent by one logical partition to a receiving logical partition over a virtual Ethernet network (step 602). In other words, when a TCP/IP stack of one logical partition is establishing a connection with another TCP/IP stack of a different logical partition, the TCP/IP stack determines whether the underlying outgoing interface is a virtual Ethernet. If the data message is not to be sent over a virtual Ethernet at step 602, virtual segmentation off-load, such as virtual TSO, is not an option and the process terminates thereafter.

Returning to step 602, if the message data is to be sent over a virtual Ethernet, the process sends a synchronization (sync) package that includes a virtual TSO option to the other TCP/IP stack of the receiving logical partition (step 604). In this example, the virtual TSO option is a virtual segmentation off-load feature. Next, the process receives a synchronization acknowledgement (sync-Ack) package from the other TCP/IP stack of the receiving logical partition (step 606).

The process makes a determination as to whether the sync-Ack data package includes a virtual TSO option (step 608). If the sync-Ack package does not include a virtual TSO option at step 608, the receiving logical partition does not support virtual TSO and the process terminates thereafter.

Returning now to step 608, if the sync-Ack package includes a virtual TSO option, the receiving logical partition does support virtual TSO. The process formats the data message into a virtual segmentation off-load data package (step 610). In this example, the virtual segmentation off-load data package is a virtual TSO data package. The process sends the virtual TSO data package to a virtual Ethernet adapter device driver on the receiving logical partition (step 612) with the process terminating thereafter.

In this illustrative example, the process utilizes a transmission control protocol segmentation off-load to form a virtual TSO package. However, the illustrative embodiments are not limited to transmission control protocol segmentation off-load. Any type of known or available segmentation off-load protocol may be utilized to form a virtual segmentation off-load package, such as a virtual TSO package.

Figure 7:
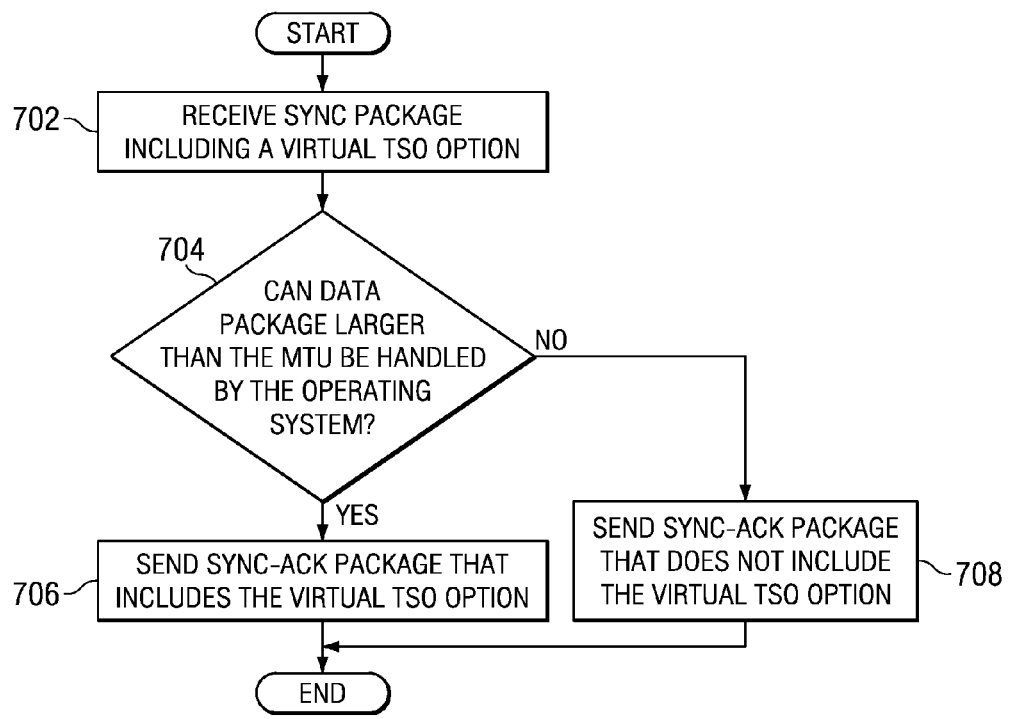
FIG. 7 a flowchart illustrating a process for a response to an initiator of a TCP connection negotiation in accordance with an illustrative embodiment.

FIG. 7 is a flowchart illustrating a process for a response to an initiator of a TCP connection negotiation in accordance with an illustrative embodiment. In this illustrative example shown in FIG. 7, the process is performed by a software component for enabling connections and communications between logical partitions in a virtual network. For example, a virtual network may be a virtual Ethernet network.

The process may be performed by any protocol for transmitting data, including but not limited to, a transmission control protocol stack, such as TCP/IP stacks 518 and 520 of FIG. 5. The process takes place when a TCP stack on one logical partition initiates TCP connection negotiation with a TCP stack on a receiving logical partition by sending a synchronization package. In this example, the virtual segmentation off-load data package is a virtual TSO data package. However, the process is not limited to transmission control protocol segmentation off-load. Any known or available segmentation off-load protocol may be used to perform virtual segmentation off-load in accordance with the illustrative embodiment shown in FIG. 7.

The process begins when a TCP stack receives a synchronization (sync) data packet that includes a virtual TSO option (step 702) from an initiating TCP stack. The TCP stack makes a determination as to whether data packages larger than the MTU size can be handled by the operating system for the logical partition on which the TCP stack is located (step 704). If the operating system can handle data packages larger than the MTU size, the TCP stack sends a synchronization acknowledge (sync-Ack) package that includes the virtual TSO option to the initiating TCP stack (step 706) with the process terminating thereafter.

Returning to step 704, if the operating system cannot support data packages that are larger than the MTU size, the TCP stack sends a sync-Ack package that does not include the virtual TSO plan (step 708) with the process terminating thereafter.

Figure 8:
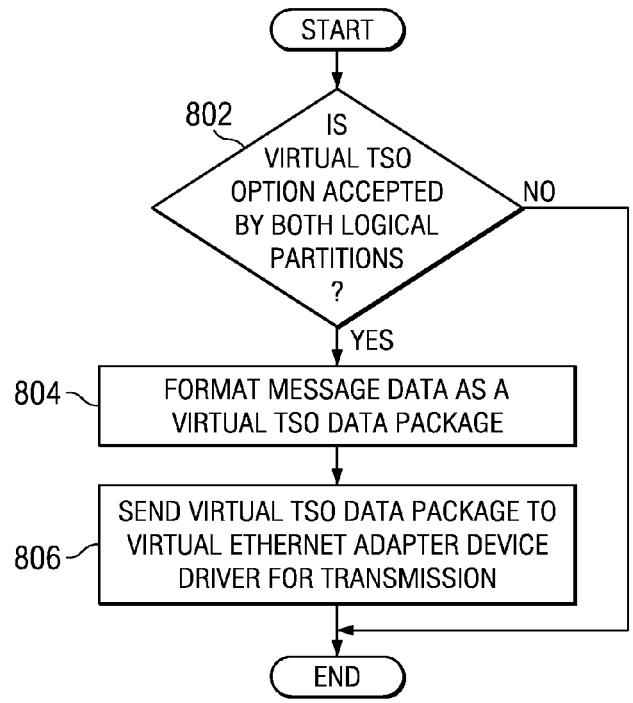
FIG. 8 a flowchart illustrating a process for creating a virtual segmentation off-load data package in accordance with an illustrative embodiment.

Referring now to FIG. 8, a flowchart illustrating a process for creating a virtual TSO data package is depicted in accordance with an illustrative embodiment. In this illustrative example shown in FIG. 8, the process is performed by a software component for enabling connections and communications between logical partitions in a virtual Ethernet network. The process may be performed by any protocol for transmitting data, including but not limited to, a transmission control protocol stack, such as TCP/IP stacks 518 and 520 of FIG. 5.

The process begins by making a determination as to whether a virtual TSO option is accepted by both logical partitions that are attempting to establish a connection over a virtual Ethernet network (step 802) to transmit a data package from one logical partition to a receiving logical partition. This determination is made during connection establishment when an initiating logical partition engages in a TCP connection negotiation with a receiving logical partition. The initiating logical partition indicates a virtual TSO option is accepted by including a virtual TSO option in a sync package sent to the second logical partition. The receiving logical partition indicates that a virtual TSO option is accepted by including a virtual TSO option in a sync-Ack package sent to the initiating logical partition.

If both logical partitions do not support virtual TSO option at step 802, the process terminates thereafter. However, if the virtual TSO option is supported or accepted by both logical partitions at step 802, the process formats the data as a normal TSO data package to form a virtual TSO data package (step 804). The virtual TSO data package is a virtual segmentation off-load package. Next, the process sends the virtual TSO data package to virtual Ethernet adapter device driver for transmission (step 806) with the process terminating thereafter.

In the example shown in FIG. 8, the virtual segmentation off-load data package is a virtual TSO data package. However, the process in FIG. 8 is not limited to transmission control protocol segmentation off-load protocols and transmission control protocol formatting of data messages. Any known or available segmentation off-load protocol may be used to format a data message to generate a virtual segmentation off-load data package and/or perform virtual segmentation off-load in accordance with the illustrative embodiment shown in FIG. 8.

Figure 9:
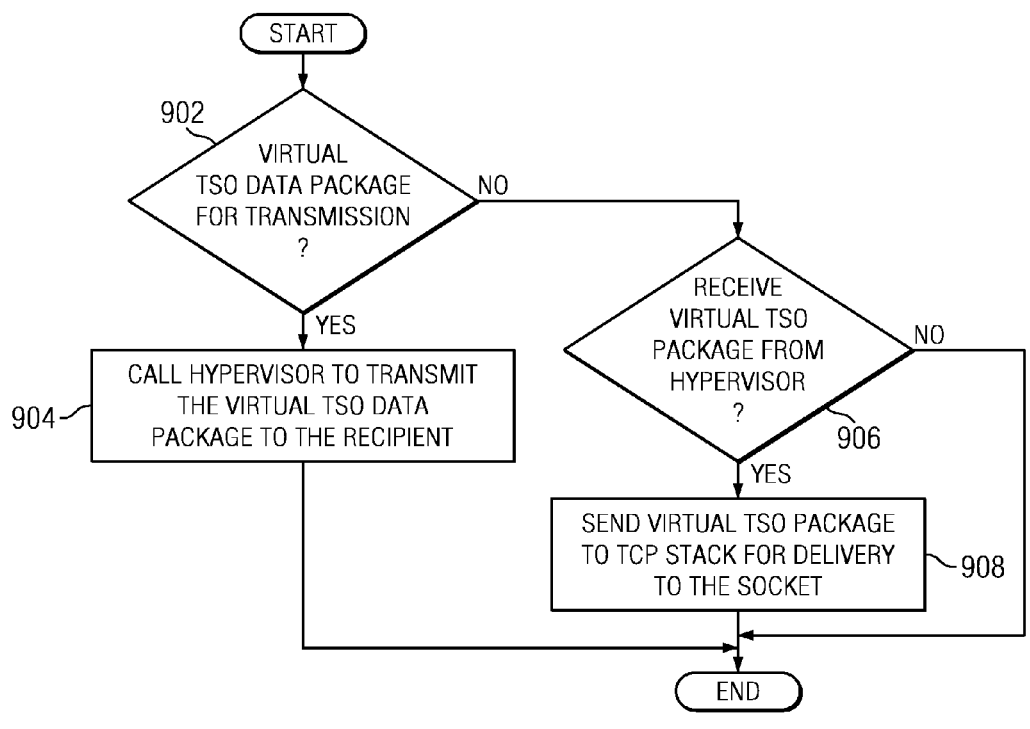
FIG. 9 is a flowchart illustrating a process for transmission of a virtual segmentation off-load data package between a virtual network adapter and a hypervisor in accordance with an illustrative embodiment.

FIG. 9 is a flowchart illustrating a process for transmission of a TSO data package between a virtual Ethernet adapter and a hypervisor in accordance with an illustrative embodiment. In this illustrative example shown in FIG. 9, the process is performed by a software virtual device driver, such as virtual Ethernet adapter device driver 514 and 516 of FIG. 5.

The process begins by making a determination as to whether a virtual segmentation off-load package is ready to be transmitted to a receiving logical partition (step 902). In this example, virtual segmentation off-load package is a virtual TSO package. If a virtual TSO package is ready for transmission ('yes' to step 902), the process calls a hypervisor to transmit or copy the virtual TSO data package to the receiving logical partition (step 904) with the process terminating thereafter.

The hypervisor is any partition management firmware for managing logical partitions in a logically partitioned data processing system. The process is not limited to implementation in a hypervisor and may be implemented in any partition management firmware.

Returning to step 902, if a virtual TSO data package is not ready for transmission to a receiving logical partition ('no' to step 902), the process makes a determination as to whether a virtual TSO package is received from hypervisor (step 906). If a virtual TSO package is not received, the process terminates thereafter. If a virtual TSO package is received at step 906, the process sends the virtual TSO package to a TCP stack for delivery to the receiving logical partition end-point socket (step 908) with the process terminating thereafter.

In the example shown in FIG. 9, the virtual segmentation off-load data package is a virtual TSO data package. However, the process in FIG. 9 is not limited to transmission control protocol segmentation off-load. Any known or available segmentation off-load protocol may be used to perform virtual segmentation off-load in accordance with the illustrative embodiment shown in FIG. 9.

Figure 10:
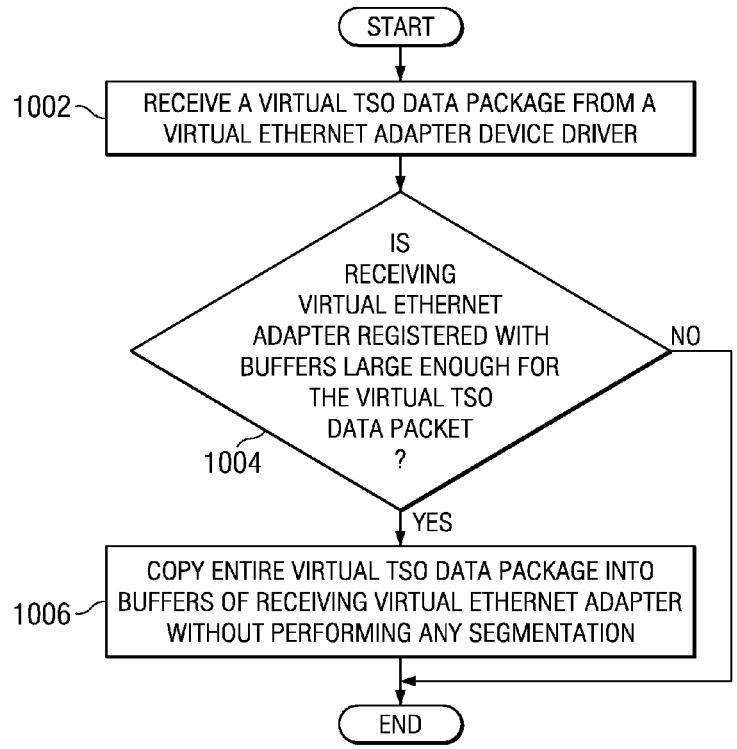
FIG. 10 is a flowchart illustrating a process for a hypervisor copying a virtual segmentation off-load data package to a virtual network adapter in accordance with an illustrative embodiment.

Turning now to FIG. 10, a flowchart illustrating a process for a hypervisor copying a virtual TSO data package to a virtual Ethernet adapter is shown in accordance with an illustrative embodiment. In this illustrative example shown in FIG. 10, the process is performed by a partition manager firmware, such as hypervisor 534 of FIG. 5.

The process begins by receiving a virtual TSO data package from a virtual Ethernet adapter device driver (step 1002). The process makes a determination as to whether the receiving virtual Ethernet adapter device driver is registered with buffers large enough to accommodate the virtual TSO data package (step 1004). If the buffer is not large enough, the process terminates thereafter.

Returning to step 1004, if the process determines that the buffers are large enough, the process copies the entire virtual TSO data package into the buffers of the receiving virtual Ethernet adapter device driver without performing any segmentation of the data (step 1006) with the process terminating thereafter.

In the example shown in FIG. 10, the virtual segmentation off-load data package is a virtual TSO data package. However, the process in FIG. 10 is not limited to transmission control protocol segmentation off-load. Any known or available segmentation off-load protocol may be used to perform virtual segmentation off-load in accordance with the illustrative embodiment shown in FIG. 10.

Figure 11:
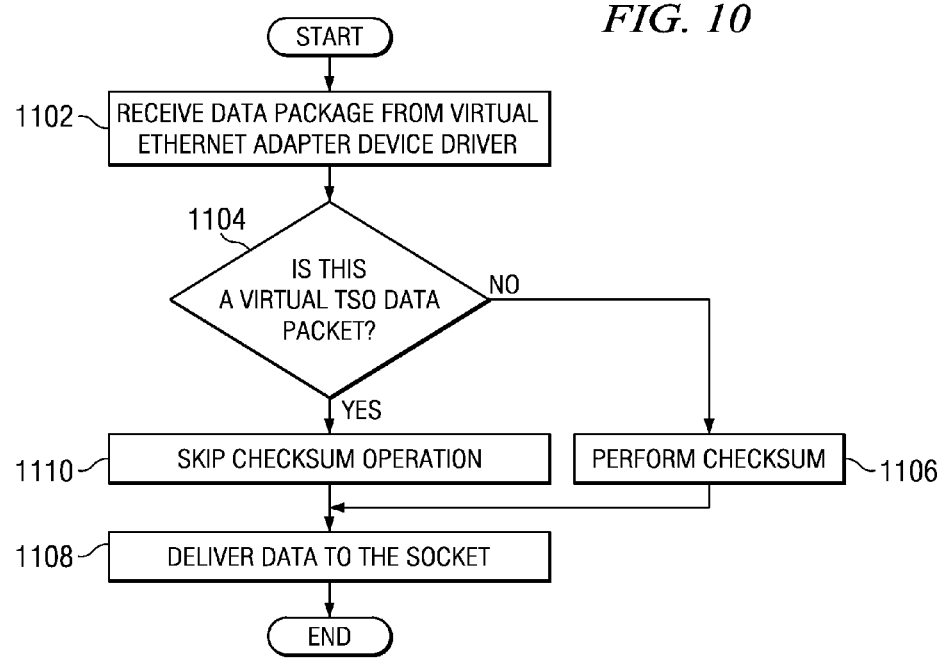
FIG. 11 is a flowchart illustrating a process for a TCP stack receiving a virtual segmentation off-load data package in accordance with an illustrative embodiment.

FIG. 11 is a flowchart illustrating a process for a TCP stack receiving a virtual TSO data package in accordance with an illustrative embodiment. In this illustrative example shown in FIG. 11, the process is performed by a software component, such as TCP/IP stacks 518 and 520 of FIG. 5.

The process begins by receiving a data package from a virtual Ethernet adapter device driver (step 1102). The process makes a determination as to whether the data package is a virtual TSO data package (step 1104). If the data package is not a virtual TSO data package, the process performs a checksum operation to ensure the data is uncorrupted (step 1106). The process then delivers the data package to the socket (step 1108) with the process terminating thereafter.

Returning now to step 1104, if the data package is a virtual TSO data package, the process skips the checksum operation (step 1110) and delivers the data package to the socket (step 1108) with the process terminating thereafter.

In the example shown in FIG. 11, the virtual segmentation off-load data package is a virtual TSO data package. However, the process in FIG. 11 is not limited to transmission control protocol segmentation off-load. Any known or available segmentation off-load protocol may be used to perform virtual segmentation off-load in accordance with the illustrative embodiment shown in FIG. 11.

The illustrative embodiments provide a computer implemented method, apparatus, and computer program product for virtual segmentation off-load in a logically partitioned data processing system. A data transmission protocol stack formats a data message as transmission control protocol segmentation off-load to form a virtual segmentation off-load package. A data transmission protocol stack includes, but is not limited to, a TCP stack. The size of the data message is larger than a size of a maximum transmission unit. A partition management firmware copies the virtual segmentation off-load package from a first logical partition to a virtual Ethernet adapter associated with a second logical partition. The virtual segmentation off-load package is copied without performing a segmentation operation on the data message associated with the virtual segmentation off-load package.

The illustrative embodiments provide a process for a logical partition to send a data package that is larger than an MTU size over a virtual Ethernet network connection without performing any segmentation of the data package. This process is advantageous because it does not require any changes to firmware, such as a hypervisor, or a virtual Ethernet network. In one embodiment, the illustrative embodiments provide an improved TCP/IP stack that permits transmission of data packages greater than MTU size without consuming processor cycles for segmentation of the data packages. However, the illustrative embodiments may be implemented using any type of data transmission protocols, including, but not limited to, TCP/IP stack.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, or an embodiment containing both hardware and software elements.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, or store the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for virtual segmentation off-load in a logically partitioned data processing system, the computer implemented method comprising:
    formatting a data message for segmentation off-load to form a virtual segmentation off-load package that contains all data from the data message without any segmentation of the data message even though a size of the data message is larger than a maximum transmission unit size;
    copying the virtual segmentation off-load package in its entirety as a single unit of data without performing a segmentation operation on the data message associated with the virtual segmentation off-load package from a first logical partition to a virtual network adapter associated with a second logical partition even though the virtual segmentation off-load package is larger than the maximum transmission unit size; and
    responsive to receiving the virtual segmentation off-load package from a virtual network adapter associated with the first logical partition, passing the virtual segmentation off-load package to a transmission control protocol stack on the second logical partition by the virtual network adapter associated with the second logical partition, wherein a checksum operation is not performed on the virtual segmentation off-load package received from the first logical partition.

2. The computer implemented method of claim 1 further comprising:
    calling a partition manager firmware to copy the virtual segmentation off-load package from the first logical partition to the virtual network adapter associated with the second logical partition.

3. The computer implemented method of claim 2 wherein the partition manager firmware can copy any size of virtual segmentation off-load package that is larger than the maximum transmission unit size from a sending virtual network adapter to a receiving virtual network adapter if a size of a buffer associated with the receiving virtual network adapter is large enough to accommodate the size of the virtual segmentation off-load package that is larger than the maximum transmission unit size.

4. The computer implemented method of claim 1 further comprising:
    performing an enhanced transmission control protocol negotiation between the first logical partition and the second logical partition to determine whether a virtual segmentation off-load option is accepted by the first logical partition and the second logical partition.

5. The computer implemented method of claim 4 further comprising:
sending a synchronization package that includes the virtual segmentation off-load option to the second logical partition, wherein the virtual segmentation off-load option in the synchronization package indicates that the virtual segmentation off-load option is supported by the first logical partition.

6. The computer implemented method of claim 4 further comprising:
responsive to a determination that the second logical partition supports the virtual segmentation off-load option, including the virtual segmentation off-load option in a synchronization acknowledgement package and sending the synchronization acknowledgement package to the first logical partition.

7. The computer implemented method of claim 1 wherein the virtual segmentation off-load package is formatted using a transmission control protocol segmentation off-load.

8. The computer implemented method of claim 1 wherein the virtual segmentation off-load package is transmitted by the first logical partition to the second logical partition in a virtual Ethernet network connection.

9. The computer implemented method of claim 1 wherein the virtual network adapter is a virtual Ethernet adapter in an Ethernet network.

10. A computer readable medium embodied with computer usable program code to be executed by a computer for virtual segmentation off-load in a logically partitioned data processing system, comprising:
computer usable program code for formatting a data message for segmentation off-load to form a virtual segmentation off-load package that contains all data from the data message without any segmentation of the data message even though a size of the data message is larger than a maximum transmission unit size;
computer usable program code for copying the virtual segmentation off-load package in its entirety as a single unit of data without performing a segmentation operation on the data message associated with the virtual segmentation off-load package from a first logical partition to a virtual network adapter associated with a second logical partition even though the virtual segmentation off-load package is larger than the maximum transmission unit size; and
computer usable program code, responsive to receiving the virtual segmentation off-load package from a virtual network adapter associated with the first logical partition, for passing the virtual segmentation off-load package to a transmission control protocol stack on the second logical partition by the virtual network adapter associated with the second logical partition, wherein a checksum operation is not performed on the virtual segmentation off-load package received from the first logical partition.

11. The computer readable medium of claim 10 further comprising:
computer usable program code for calling a partition manager firmware to copy the virtual segmentation off-load package from the first logical partition to the virtual network adapter associated with the second logical partition.

12. The computer readable medium of claim 10 wherein the partition manager firmware can copy any size of virtual segmentation off-load package that is larger than the maximum transmission unit size from a sending virtual network adapter to a receiving virtual network adapter if a size of a buffer associated with the receiving virtual network adapter is large enough to accommodate the size of the virtual segmentation off-load package that is larger than the maximum transmission unit size.

13. An apparatus comprising:
a bus system;
a communications system connected to the bus system;
a memory connected to the bus system, wherein the memory includes computer usable program code; and
a processing unit connected to the bus system, wherein the processing unit executes the computer usable program code to format a data message for segmentation off-load to form a virtual segmentation off-load package that contains all data from the data message without any segmentation of the data message even though a size of the data message is larger than a maximum transmission unit size; copy the virtual segmentation off-load package in its entirety as a single unit of data without performing a segmentation operation on the data message associated with the virtual segmentation off-load package from a first logical partition to a virtual network adapter associated with a second logical partition even though the virtual segmentation off-load package is larger than the maximum transmission unit size; and pass the virtual segmentation off-load package to a transmission control protocol stack on the second logical partition by the virtual network adapter associated with the second logical partition in response to receiving the virtual segmentation off-load package from a virtual network adapter associated with the first logical partition, wherein a checksum operation is not performed on the virtual segmentation off-load package received from the first logical partition.

14. A logically partitioned data processing system for virtual segmentation off-load, the system comprising:
a first logical partition, the first logical partition comprising:
a data transmission protocol stack, wherein the data transmission protocol stack formats a data message for segmentation off-load to form a virtual segmentation off-load package that contains all data from the data message without any segmentation of the data message even though a size of the data message is larger than a maximum transmission unit size; and
a virtual network adapter, wherein the virtual network adapter calls a partition manager firmware to transmit the virtual segmentation off-load package to a second logical partition in the logically partitioned data processing system; and
the partition manager firmware, wherein the partition manager firmware copies the virtual segmentation off-load package in its entirety as a single unit of data without performing a segmentation operation on the data message associated with the virtual segmentation off-load package from the first logical partition to a virtual network adapter associated with the second logical partition even though the virtual segmentation off-load package is larger than the maximum transmission unit size; and wherein the virtual segmentation off-load package is passed to a transmission control protocol stack on the second logical partition by the virtual network adapter associated with the second logical partition in response to receiving the virtual segmentation off-load package from a virtual network adapter associated with the first logical partition, and wherein a checksum operation is not performed on the virtual segmentation off-load package received from the first logical partition.

15. The system of claim 14 wherein the first logical partition further comprises:
  a transmission control protocol stack, wherein the transmission control protocol stack sends a synchronization package that includes a virtual segmentation off-load option to the second logical partition, wherein the virtual segmentation off-load option in the synchronization package indicates that the virtual segmentation off-load option is supported by the first logical partition.

16. The system of claim 15 wherein the second logical partition further comprises:
  a transmission control protocol stack, wherein the transmission control protocol stack sends a synchronization acknowledgement package that includes a virtual segmentation off-load option to the first logical partition, wherein the virtual segmentation off-load option in the synchronization acknowledge package indicates that the virtual segmentation off-load option is supported by the second logical partition.

17. The system of claim 15 wherein the partition manager firmware can copy any size of virtual segmentation off-load package that is larger than the maximum transmission unit size from the virtual network adapter of the first logical partition to the second logical partition if a size of a buffer associated with the second logical partition is large enough to accommodate the size of the virtual segmentation off-load package that is larger than the maximum transmission unit size.

* * * * *